United States Patent
Schweitzer, III (10) Patent No.: US 8,526,156 B2
(45) Date of Patent: Sep. 3, 2013

(54) HIGH SPEED SIGNALING OF POWER SYSTEM CONDITIONS

(75) Inventor: Edmund O. Schweitzer, III, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 4 days.

(21) Appl. No.: 13/333,012

(22) Filed: Dec. 21, 2011

(65) Prior Publication Data

US 2013/0163132 A1 Jun. 27, 2013

(51) Int. Cl.
*H01H 73/00* (2006.01)

(52) U.S. Cl.
USPC ........................................................ 361/115

(58) Field of Classification Search
USPC ........................................................ 361/115
See application file for complete search history.

(56) References Cited

U.S. PATENT DOCUMENTS

| | | |
|---|---|---|
| 2,379,664 A | 7/1945 | Stanko |
| 2,928,048 A | 3/1960 | Postal |
| 2,967,267 A | 1/1961 | Steinman |
| 3,292,579 A | 12/1966 | Buchanan |
| 3,296,493 A | 1/1967 | Whittaker |
| 3,476,997 A | 11/1969 | Otzipka |
| 3,525,903 A | 8/1970 | Morris |
| 3,621,334 A | 11/1971 | Burns |
| 3,676,740 A | 7/1972 | Schweitzer |
| 3,702,966 A | 11/1972 | Schweitzer |
| 3,708,724 A | 1/1973 | Schweitzer |
| 3,715,742 A | 2/1973 | Schweitzer |
| 3,781,682 A | 12/1973 | Schweitzer |
| 3,816,816 A | 6/1974 | Schweitzer |
| 3,866,197 A | 2/1975 | Schweitzer |
| 3,876,911 A | 4/1975 | Schweitzer |
| 3,906,477 A | 9/1975 | Schweitzer |
| 3,972,581 A | 8/1976 | Oldham |
| 3,974,446 A | 8/1976 | Schweitzer |
| 4,029,951 A | 6/1977 | Berry |
| 4,034,360 A | 7/1977 | Schweitzer |
| 4,038,625 A | 7/1977 | Tompkins |
| 4,045,726 A | 8/1977 | Schweitzer |
| 4,063,171 A | 12/1977 | Schweitzer |
| 4,086,529 A | 4/1978 | Schweitzer |
| 4,112,292 A | 9/1978 | Varvel |
| 4,144,485 A | 3/1979 | Akita |
| 4,165,528 A | 8/1979 | Schweitzer |
| 4,186,986 A | 2/1980 | Shoemaker |

(Continued)

OTHER PUBLICATIONS

Siemens PTD EA, Coordination of Inverse-Time Overcurrent Relays with Fuses, Applications for SIPROTEC Protection Relays, 2005.

(Continued)

*Primary Examiner* — Scott Bauer
(74) *Attorney, Agent, or Firm* — Richard M. Edge (57) ABSTRACT

A high-speed signaling device on a branch of an electric power distribution system modulates the signal from the branch and communicates the signal to an intelligent electronic device on a feeder to the branch at speeds sufficient for the intelligent electronic device to modify protection algorithms based on the signal from the high-speed signaling device. The intelligent electronic device may be a recloser control that controls protective equipment such as a recloser. The signal may be sent via infrared and/or radio frequency. The signal may be modulated so as to communicate information such as the phase with which it is associated. The high-speed signaling device may further communicate current information to the intelligent electronic device.

24 Claims, 7 Drawing Sheets

(56) References Cited

U.S. PATENT DOCUMENTS

| | | |
|---|---|---|
| 4,199,741 A | 4/1980 | Serrus Paulet |
| 4,234,847 A | 11/1980 | Schweitzer |
| 4,251,770 A | 2/1981 | Schweitzer |
| 4,288,743 A | 9/1981 | Schweitzer |
| 4,375,617 A | 3/1983 | Schweitzer |
| 4,414,543 A | 11/1983 | Schweitzer |
| 4,424,512 A | 1/1984 | Schweitzer |
| 4,438,403 A | 3/1984 | Schweitzer |
| 4,456,873 A | 6/1984 | Schweitzer |
| 4,458,198 A | 7/1984 | Schweitzer |
| 4,495,489 A | 1/1985 | Schweitzer |
| 4,536,758 A | 8/1985 | Schweitzer |
| 4,599,487 A | 7/1986 | Blank |
| 4,686,518 A | 8/1987 | Schweitzer |
| 4,689,752 A | 8/1987 | Fernandes |
| 4,709,339 A | 11/1987 | Fernandes |
| 4,794,332 A | 12/1988 | Schweitzer |
| 4,795,982 A | 1/1989 | Schweitzer |
| 4,829,298 A | 5/1989 | Fernandes |
| 4,834,485 A | 5/1989 | Lee |
| 4,940,976 A | 7/1990 | Gastouniotis |
| 4,996,624 A | 2/1991 | Schweitzer |
| 5,008,651 A | 4/1991 | Schweitzer |
| 5,038,246 A | 8/1991 | Durivage |
| 5,070,301 A | 12/1991 | Schweitzer |
| 5,089,928 A | 2/1992 | Durivage |
| 5,136,457 A | 8/1992 | Durivage |
| 5,136,458 A | 8/1992 | Durivage |
| 5,150,361 A | 9/1992 | Wieczorek |
| 5,153,565 A | 10/1992 | Schweitzer |
| 5,168,414 A | 12/1992 | Horstmann |
| 5,196,682 A | 3/1993 | Englehardt |
| 5,220,311 A | 6/1993 | Schweitzer |
| 5,298,894 A | 3/1994 | Cerny |
| 5,303,112 A | 4/1994 | Zulaski |
| 5,420,502 A | 5/1995 | Schweitzer |
| 5,438,329 A | 8/1995 | Gastouniotis |
| 5,495,239 A | 2/1996 | Ouellette |
| 5,519,527 A | 5/1996 | Panton |
| 5,542,856 A | 8/1996 | Wood |
| 5,550,476 A | 8/1996 | Lau |
| 5,565,783 A | 10/1996 | Lau |
| 5,648,726 A | 7/1997 | Le |
| 5,656,931 A | 8/1997 | Lau |
| 5,659,300 A | 8/1997 | Dresselhuys |
| 5,677,623 A | 10/1997 | Schweitzer |
| 5,677,678 A | 10/1997 | Schweitzer |
| 5,701,121 A | 12/1997 | Murdoch |
| 5,793,214 A | 8/1998 | Wakamatsu |
| 5,821,869 A | 10/1998 | Schweitzer |
| 5,825,303 A | 10/1998 | Bloss |
| 5,862,391 A | 1/1999 | Salas |
| 5,877,703 A | 3/1999 | Bloss |
| 5,889,399 A | 3/1999 | Schweitzer |
| 6,002,260 A | 12/1999 | Lau |
| 6,014,301 A | 1/2000 | Schweitzer |
| 6,016,105 A | 1/2000 | Schweitzer |
| 6,029,061 A | 2/2000 | Kohlschmidt |
| 6,072,405 A | 6/2000 | Sears |
| 6,078,785 A | 6/2000 | Bush |
| 6,101,075 A | 8/2000 | Roberts |
| 6,133,723 A | 10/2000 | Feight |
| 6,133,724 A | 10/2000 | Schweitzer |
| 6,177,883 B1 | 1/2001 | Jennetti |
| 6,188,216 B1 | 2/2001 | Fromer |
| 6,239,722 B1 | 5/2001 | Colton |
| 6,326,905 B1 | 12/2001 | Walters |
| 6,349,248 B1 | 2/2002 | Dean |
| 6,366,217 B1 | 4/2002 | Cunningham |
| 6,380,733 B1 | 4/2002 | Apel |
| 6,414,605 B1 | 7/2002 | Walden |
| 6,429,661 B1 | 8/2002 | Schweitzer |
| 6,433,698 B1 | 8/2002 | Schweitzer |
| 6,479,981 B2 | 11/2002 | Schweitzer |
| 6,525,504 B1 | 2/2003 | Nygren |
| 6,573,707 B2 | 6/2003 | Kiriyama |
| 6,577,608 B1 | 6/2003 | Moon |
| 6,617,976 B2 | 9/2003 | Walden |
| 6,654,216 B2 | 11/2003 | Horvath |
| 6,671,824 B1 | 12/2003 | Hyland |
| 6,687,110 B2 | 2/2004 | Murray |
| 6,687,573 B2 * | 2/2004 | Egolf et al. .................. 700/292 |
| 6,736,646 B2 | 5/2004 | Takahashi |
| 6,753,792 B2 | 6/2004 | Beckwith |
| 6,759,933 B2 | 7/2004 | Fallak |
| 6,796,821 B2 | 9/2004 | Cairns |
| 6,798,211 B1 | 9/2004 | Rockwell |
| 6,822,576 B1 | 11/2004 | Feight |
| 6,828,906 B2 | 12/2004 | Malcolm |
| 6,944,555 B2 | 9/2005 | Blackett |
| 6,949,921 B1 | 9/2005 | Feight |
| 6,963,197 B1 | 11/2005 | Feight |
| 7,023,691 B1 | 4/2006 | Feight |
| 7,053,601 B1 | 5/2006 | Fenske |
| 7,106,048 B1 | 9/2006 | Feight |
| 7,254,001 B2 | 8/2007 | Papallo |
| 7,271,580 B1 | 9/2007 | Fenske |
| 7,315,169 B1 | 1/2008 | Fenske |
| 7,496,430 B2 | 2/2009 | Mak |
| 2002/0089802 A1 | 7/2002 | Beckwith |
| 2002/0181566 A1 * | 12/2002 | Lund ............................ 375/219 |
| 2003/0020765 A1 | 1/2003 | Kussmaul |
| 2003/0119568 A1 | 6/2003 | Menard |
| 2003/0153368 A1 | 8/2003 | Bussan |
| 2003/0174067 A1 | 9/2003 | Soliman |
| 2003/0178290 A1 | 9/2003 | Schilling |
| 2003/0179149 A1 | 9/2003 | Savage |
| 2004/0005809 A1 | 1/2004 | Suzuki |
| 2004/0032340 A1 | 2/2004 | Lingafeldt |
| 2004/0036478 A1 | 2/2004 | Logvinov |
| 2004/0067366 A1 | 4/2004 | Gorczyca |
| 2004/0113810 A1 | 6/2004 | Mason |
| 2004/0214616 A1 | 10/2004 | Malcolm |
| 2004/0233159 A1 | 11/2004 | Badarneh |
| 2005/0040809 A1 | 2/2005 | Uber |
| 2005/0068193 A1 | 3/2005 | Osterloh |
| 2005/0068194 A1 | 3/2005 | Schleich |
| 2005/0079818 A1 | 4/2005 | Atwater |
| 2005/0087599 A1 | 4/2005 | Ward |
| 2005/0110656 A1 | 5/2005 | Patterson |
| 2005/0132115 A1 | 6/2005 | Leach |
| 2005/0151659 A1 | 7/2005 | Donovan |
| 2005/0163432 A1 | 7/2005 | Montena |
| 2005/0205395 A1 | 9/2005 | Dietrich |
| 2005/0215280 A1 | 9/2005 | Twitchell, Jr. |
| 2006/0084419 A1 | 4/2006 | Rocamora |
| 2008/0077336 A1 | 3/2008 | Fernandes |
| 2010/0309004 A1 * | 12/2010 | Grundler et al. .............. 340/588 |

OTHER PUBLICATIONS

G. Benmouyal, et al., IEEE Standard Inverse-Time Characteristics and Equations for Overcurrent Relays, IEEE Transactions on Poer Delivery, Vo. 14, No. 3, Jul. 1999.

S&C Electric Company, S&C Intellirupter PulseCloser Specifications, Dec. 18, 2006.

S&C Electric Company, S&C Intellirupter PulseCloser Outdoor Distribution 14.4 kV and 25 kV Descriptive Bulletin, Feb. 7, 2006.

E.O. Schweitzer, III, S.E.Zocholl, Aspects of Overcurrent Protection for Feeders and Motors, May 25-26, 1995.

Anh Le, Dave Donovan, Bill Doherty, Technical Applications Data, Fisher Pierce Division of Pacific Scientific-Faulted Circuit Indicators, 1995.

Radio Receivers Series 1560 Handheld or RTU/SCADAhttp://www.joslynhivoltage.com/cat1560.htm, Joslyn Hi-Voltage, Jul. 21, 2008.

Fisher Pierce-Radio Faulted Circuit Indicator System www.joslynhivoltage.com, Joslyn Hi-Voltage, 1999.

Outage Advisor-Fault Detection & Location in Solution-B320-08001 www.cooperindustries.com, Cooper Power Systems, Grid Advisor 2008.

Outage Advisor-Fault Detection & Location Solution-Sensus Flexnet Communications-B320-08003 www.cooperindustries.com, Cooper Power Systems, Grid Advisor, 2008.

WebExchange B320-08005 www.cooperindustries.com, Cooper Power Systems, Grid Advisor, 2008.

Outage Advisor-Fault Detection & Location Solution- Cellular Communications B320-08002 www.cooperindustries.com, Cooper Power Systems, Grid Advisor, 2008.

Exchange B320-08004 www.cooperindustries.com, Cooper Power Systems, Grid Advisor, 2008.

PCT/US2012/68919 Patent Cooperation Treaty, International Search Report and Written Opinion of the International Searching Authority, Feb. 22, 2013.

* cited by examiner

HIGH SPEED SIGNALING OF POWER SYSTEM CONDITIONS

TECHNICAL FIELD

The present disclosure relates generally to apparatus, systems, and methods for detecting and communicating conditions on an electric power conductor at a high speed, and more particularly to apparatuses, systems, and methods for coordinating fault isolation in a manner using such high-speed communication to minimize the effect on the power system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power distribution systems typically include several types and pieces of equipment configured for delivery of electric power to customers. Some exemplary types of equipment used include power conductors (which may be above-ground or below-ground), transformers, circuit breakers, fuses, reclosers, capacitor banks, voltage regulators, and the like. Electric power distribution system equipment is often controlled, monitored, and/or protected using power system devices such as intelligent electronic devices ("IEDs") (such as, for example, protective relays, recloser controls, distance relays, differential relays, transformer relays, bay controllers, feeder relays, directional relays, voltage regulator controls, communications processors, transformer relays, overcurrent relays, and the like), remote terminal units, faulted circuit indicators ("FCIs"), Supervisory Control and Data Acquisition systems, and the like.

Faults occur on electric power distribution system for several reasons. Regardless of the reason, however, faults pose a significant risk to both the electric power system and recipients of the electric power from the distribution system. To this end, electric power distribution systems often include various pieces of protective equipment that react to faults in a way that removes a faulted section of the distribution system from electric power supply. The result is that the remaining portion of the distribution system can continue to operate normally without the removed section. Another result is that recipients of electric power on the removed section remain without electric power until the fault is cleared and power to that section is restored.

Protective equipment that may be used to remove portions of the distribution system from electric power supply includes fuses, circuit breakers, reclosers, and the like. Fuses are typically configured to open a circuit when the current through the fuse remains above a predetermined level for a predetermined amount of time. Fuses may have a time-inverse characteristic such that higher fault currents will cause the fuse to open in shorter times than lower fault currents.

Circuit breakers and reclosers may be controlled by a protective device such as an IED. The IED may be capable of performing protection logic based on detected power system conditions and signal the circuit breaker to open only if certain conditions are met. The IED may similarly operate in a time-inverse manner, following, for example, an inverse-time overcurrent characteristic. Accordingly, the IED may require an overcurrent condition to persist for a predetermined amount of time depending on the magnitude of the overcurrent before declaring a fault condition. If the IED operates in an inverse-time overcurrent manner, logic therein may declare a fault condition for a higher magnitude overcurrent persisting for a shorter length of time than the time required for a lower-magnitude overcurrent condition to persist. Once a fault condition has been detected, the IED may set an alarm and/or take an action such as sending a command for the circuit breaker or recloser to open. The IED may be a recloser control such as the 351R or 651R available from Schweitzer Engineering Laboratories, Inc., of Pullman, Wash. The IED may be configured to perform protection algorithms based on power system conditions and signal the recloser to open the power line when certain conditions are met. The IED for the recloser may be further configured to signal the recloser to close the power line shortly after opening thereof to determine when the fault has cleared, and restore power to the removed section of the distribution system. If the fault still persists, the IED may signal the recloser to open the line again.

Distribution systems may be configured with several pieces of protective equipment located on various feeders and branches of the power system. As it is preferable to remove the smallest possible section of the distribution system upon occurrence of a fault, the distribution system may be configured to limit which pieces of protective equipment operate for detected faults. Such protective schemes often require communication between protective devices. Some equipment, however, are not controlled by an IED and/or have no means of communicating with other protective equipment or devices. A fuse, for example, is not controlled by an IED, and has no means of communicating with other protective equipment or devices. Accordingly, a fuse operates regardless of operation of other power system equipment.

Distribution systems may be monitored by FCIs configured to detect fault currents and provide indication of a fault on the monitored conductor. FCIs may be installed on overhead or underground conductors, and may draw the power that they use by capacitive and/or inductive coupling with the monitored conductor and/or an internal battery. Several types and functions of FCIs are described in U.S. Pat. Nos. 3,676,740, 3,906,477, 4,063,171, 4,234,847, 4,375,617, 4,438,403, 4,456,873, 4,458,198, 4,495,489, 4,974,329, 5,220,311, 5,677,678, 6,016,105, 6,133,723, 6,133,724, 6,822,576, 6,949,921, 6,963,197, 7,023,691, 7,053,601, 7,106,048, 7,271,580, and 7,315,169, all of which are hereby incorporated by reference.

Detection of fault currents in a monitored conductor by an FCI may be accomplished by magnetic switch means, such as a magnetic reed switch, in close proximity to the conductor being monitored. Upon occurrence of an abnormally high fault-associated magnetic field around the conductor, the magnetic switch actuates a trip circuit that produces current flow in a trip winding to position an indicator flag visible from the exterior of the indicator to a trip or fault indicating position. Upon restoration of current in the conductor (after protective equipment has open the line and the fault has cleared), a reset circuit is actuated to produce current flow in a reset winding to reposition the target indicator to a reset or non-fault indicating position, or the FCI may be manually reset. FCIs may include a microprocessor for further signal processing and control of other processes within the FCI.

FCIs may include other indicating means to indicate when the FCI has detected a fault on the power conductor, for example, a light emitting diode (LED). Further, FCIs may be equipped with radio communication means to communicate with a receiver that the FCI has detected a fault on the power conductor.

FCIs are typically used by power distribution personnel to visually locate a permanent or temporary fault, and not in protection schemes for the electric power system. That is, the FCI does not typically control protective equipment. However, once a fault has been detected and cleared, power distribution personnel may visually inspect the FCIs to determine where the fault may have occurred on the power distribution system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

The present disclosure includes a high-speed signaling device ("HSD") that may be coupled to a conductor of an electric power distribution system and configured to provide high-speed signaling of conditions on the conductor to a protective device. The HSD may be incorporated into or part of an FCI, or may be a stand-alone device. An embodiment of an overhead HSD is illustrated in FIGS. 1A and 1B.

Figure 1A:
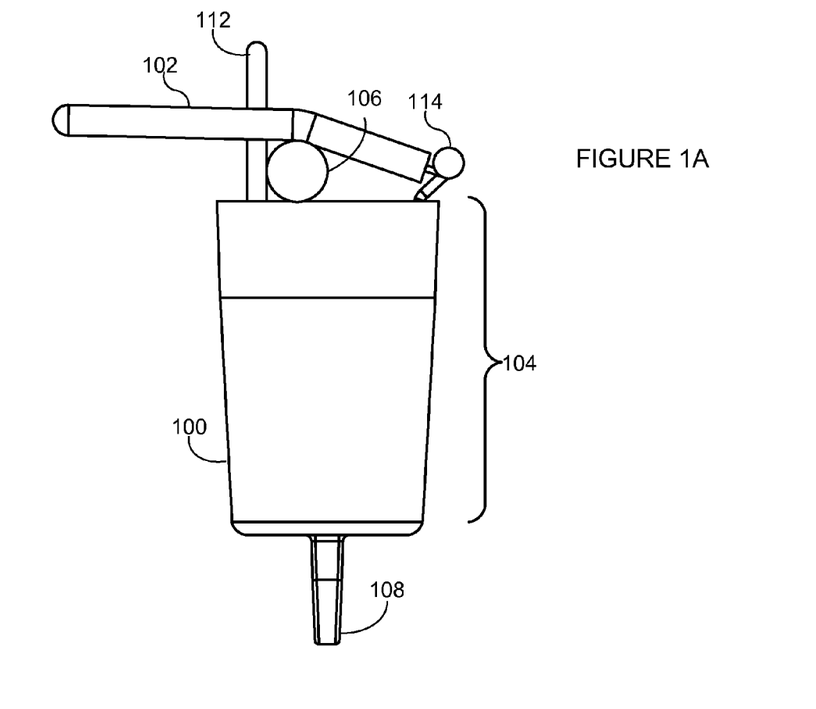
FIG. 1A illustrates a side view of a high-speed signaling device.

FIG. 1A illustrates a side view of an HSD 100. The HSD may include a housing 104 and a protruding eye 108 that allows for the use of a hot stick during installation to or removal from a conductor 106. The housing 104 houses the various circuitry and other modules of the HSD 100. One component in the housing 104 is a current transformer (discussed below). The current transformer includes a pole piece 112 that extends through the housing 104 in an orientation that is generally perpendicular to the rear face of the housing 104. The exterior portion of the pole piece 112 may be coated with an insulating material or may have an insulating sleeve disposed thereon. A clamp assembly 102 attaches the HSD 100 to the monitored conductor such as a cable 106, and holds the cable 106 in close proximity to the pole piece 112 of the current transformer. The clamp assembly 102 is designed to accommodate for a range of conductors 106 having different diameters. When installed on a typical overhead conductor, the HSD 100 hangs such that the pole piece 112 is directed generally upward.

Figure 1B:
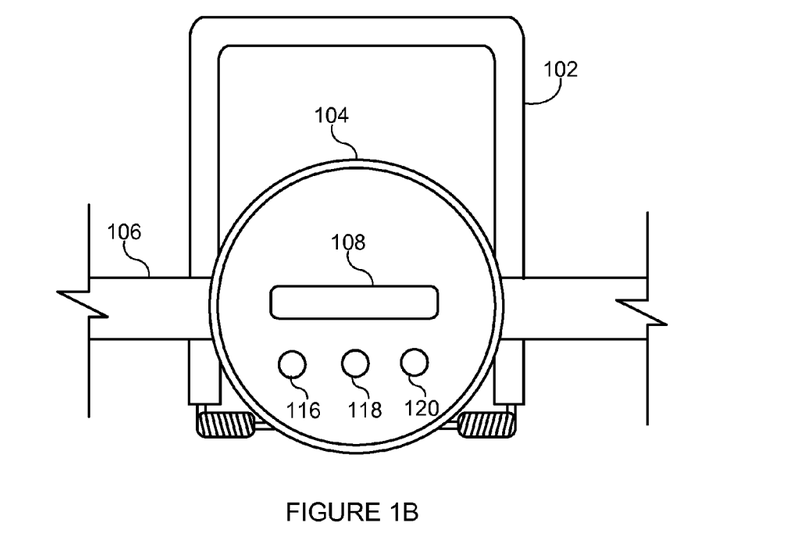
FIG. 1B illustrates a bottom view of a high-speed signaling device.

FIG. 1B illustrates a face of the HSD 100 which is directed in a downward direction when the HSD 100 is installed on a typical overhead conductor. The face may include a plurality of transmitters such as, for example, a fiber-optic port 116 (such as an ST connector), a radio antenna 118, and an LED 120. The transmitters 118-120 may be configured to supply the high-speed communication using light (e.g. infrared over fiber optics or a laser), radio, and/or visual light (using the LED).

Figure 2:
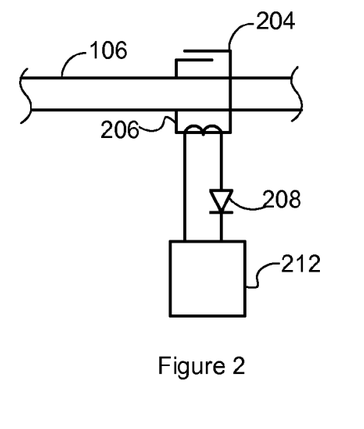
FIG. 2 is a block diagram of a high-speed signaling device.
Figure 3:
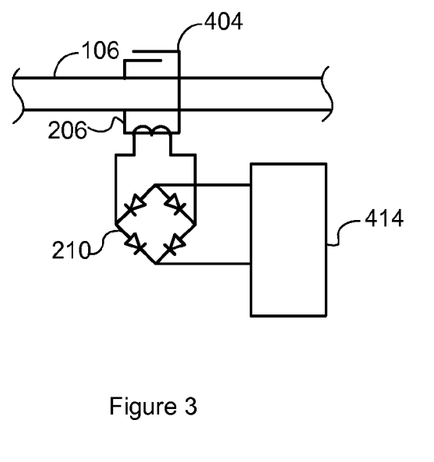
FIG. 3 is a block diagram of a high-speed signaling device.
Figure 4:
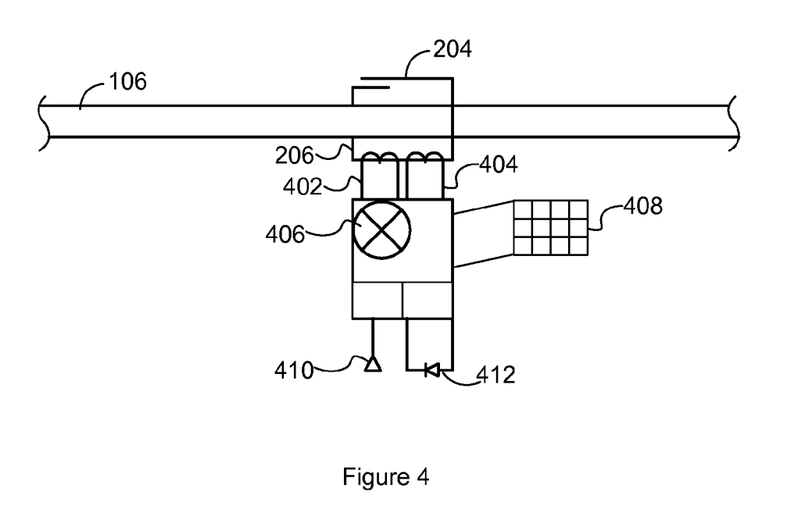
FIG. 4 is a block diagram of a high-speed signaling device.

FIGS. 2-4 illustrate block diagrams of possible configurations of the HSD. As mentioned above, the signaling of power conductor information to a protective device according to the HSDs of the present disclosure is sufficiently fast such that the protective device is capable of reacting to the information from the HSD before taking protective actions. In some cases, the protective device will modify its protective algorithms depending on the information received from the HSD. Thus, the HSD of the present disclosure is configured to communicate detected power system conditions to the protective device at a high speed.

To this end, the HSD of FIG. 2 includes a current transformer 206 configured to detect current on the power conductor 106. The current transformer is in electrical communication with, and applies the signal to a signaling circuit for producing a signal representative of the sensed current. The signaling circuit may be a modulator such as modulator 212 that is electrically connected to another terminal of the current transformer 206. The circuit also includes a signal generator such as an infrared emitting diode (IRED) 208 (alternatively an LED) such that a portion of the energy from the current on the conductor 106 is transformed into radiation (infrared) by the IREDs 208. The signal generator could be any of a number of devices capable of generating a detectable signal, such as a laser, a radio transmitter, or the like. The IRED 208 may be controlled by the modulator 212 such that the output of the IRED 208 is a modulated signal and indicates the sensed current on the conductor 106. Thus, the IRED 208 provides a signal representative of the current on the power conductor. The light emitting diode 208 may be in communication with the fiber optic port 116 (see FIG. 1B) such that the signal therefrom may be communicated via the port 116 to a protective device. Thus, the HSD is capable of producing a signal corresponding with the current through an electrical conductor 106 at rates comparable to real-time.

FIG. 3 illustrates an embodiment of the HSD similar to that in FIG. 2, except that the modulator is a shunt modulator 414, and receives the electrical signal from current transformer 206 by way of diode bridge 210.

FIG. 4 illustrates an embodiment of the HSD similar to that in FIGS. 2 and 3. The HSD of FIG. 4 includes two separate CTs 402 and 404. CT 402 may be a sensing CT used to provide a signal representative of current flow through the conductor 106, wherein CT 404 may be used to provide operating power to the HSD using known techniques. The HSD may further include an alternative power source such as a battery (not separately illustrated) or solar panel 408 such that the HSD can continue operation when no power is provided to the HSD via CT 404 (e.g. when there is no current flow through the conductor).

HSD of FIG. 4 further includes a fault indication means for providing a visual indication that the HSD has detected a fault on the conductor 106. The fault indicating means may be a flag 406 that changes position to indicate a fault when a fault is detected by the HSD. The indicating means may be a light source (such as an LED, not shown) that is connected with a power source upon detection of a fault to provide a visual indication that the HSD has detected a fault.

The HSD of FIG. 4 further includes two transmitters for high-speed signaling of power system conditions. The first is an IRED 412 configured as is described herein. The second is a radio transmission module 410 configured to broadcast power system conditions as a radio transmission. The radio-transmitting module 410 operates similarly to the IRED 412 configuration described herein except that the modulator modulates a signal sent over radio transmission via the radio transmission module 410. The FIG. 4 may include a single modulator capable of providing a modulated signal to both the radio transmission module 410 and the IRED 412. Alternatively, the HSD of FIG. 4 may include separate modulators each configured to operate with either the radio transmission module 410 or the IRED 412. The radio transmission module 410 may be in communication with the radio antenna 118 (see FIG. 1B) for radio transmission of power system conditions.

The HSD may be configured as a faulted circuit indicator in that it includes further components such as a microprocessor capable of detecting a fault condition on the monitored conductor.

Figure 5:
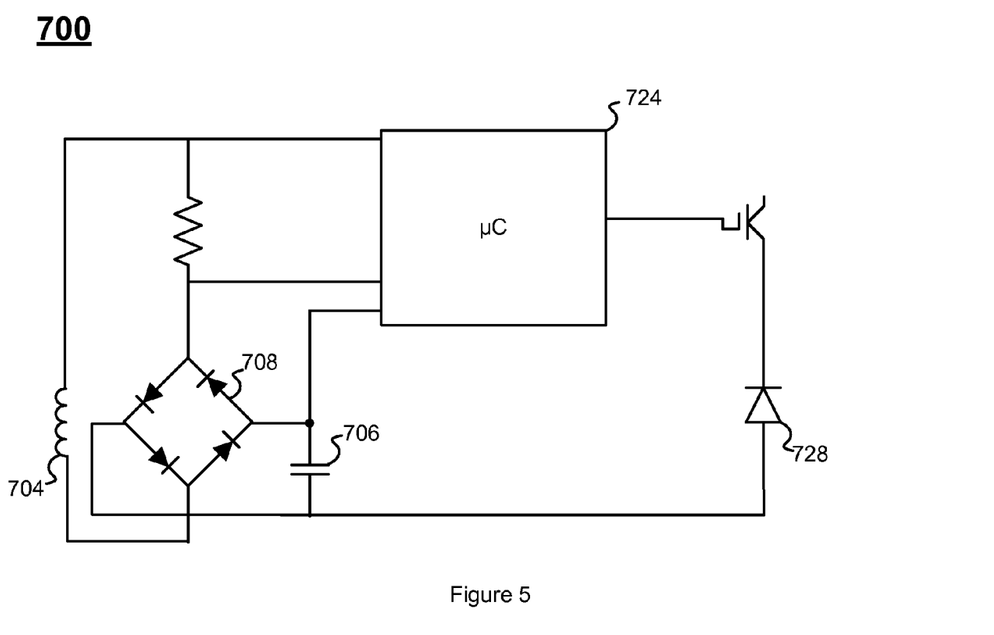
FIG. 5 is a block diagram of a high-speed signaling device.

A block diagram of an HSD is illustrated in FIG. 5. The HSD includes a CT 704 that senses electric current within an electric conductor (not shown). A rectifier 708 generates direct current, and a signal is stored at capacitor 706. A microcontroller 724 (or modulator) is used to produce a modulated signal, which is applied to the IRED 728. As is described above, the IRED may be in communication with a fiber optic port such that the signal produced by the IRED may be communicated to a protective device. The HSD of the present disclosure is capable of using load current on the conductor to provide energy for reporting of regular power system information transmission such as load current, and the like. The HSD of the present disclosure is further capable of using load and fault current to provide energy for fast reporting of fault current and/or a fault condition on the conductor.

As is described above, the communications from the HSD may be modulated using, for example, a modulator. Various modulation and encoding schemes are available and may be applied to the signal. Some examples of modulation include frequency shift keying, quadrature amplitude modulation, phase shift keying, pulse width modulation (PWM), and pulse amplitude modulation (PAM).

One issue that may be overcome through the modulation and encoding scheme is to signal which phase of a power conductor is faulted. Electric power distribution systems typically include three separate phases. Each phase may include a separate HSD installed thereon and configured to provide signaling corresponding to the phase with which it corresponds. Each of three HSDs (each installed on separate conductors, one corresponding with each phase) may signal to the same protective device. It may be important to the protection scheme that the protective device is capable of differentiating between phases and the signals representing such from the HSDs. For example, if the protective device is a three-phase recloser control capable of signaling a reclosers associated with each phase to open and close, the recloser control may require knowledge about which phase is experiencing a fault so that it may operate on the faulted phase.

Figure 6A:
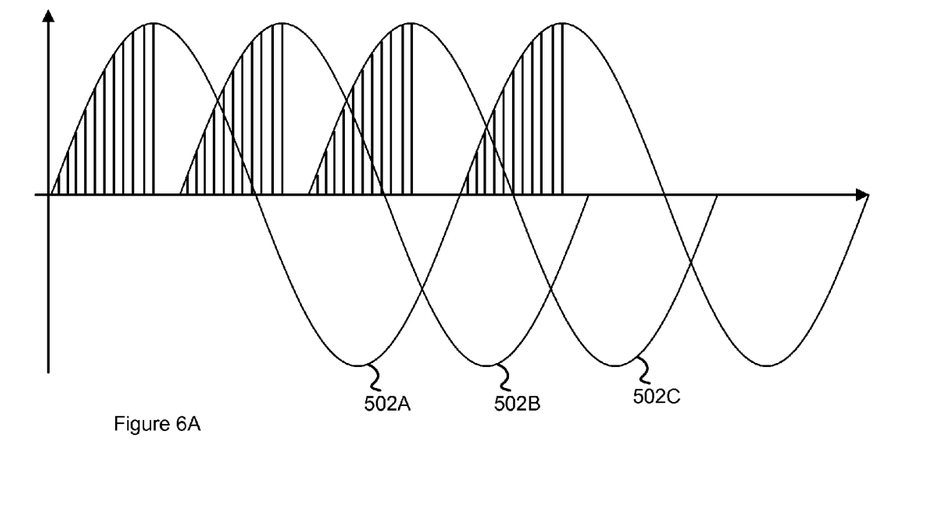
FIG. 6A illustrates a communication scheme for communicating current information.

One method of modulation that would assist in differentiating between phases is illustrated in FIG. 6A where power system information is only transmitted during a predetermined portion of a cycle, such as the rising half of a positive half cycle (i.e. where I>0 and dI/dt>0). FIG. 6A illustrates three sine waves representing a periodic power system condition such as current of three phases on an electric power delivery system. Illustrated is a current waveform associated with phase A (502A), another associated with phase B (502B), and another associated with phase C (502C). The HSD is configured only to transmit information corresponding with the periodic signal during the positive quarter cycle, as indicated. Thus, for each of the three phases, there would be a gap where there are no transmissions from any of the three phases before beginning a transmission from the first phase again.

Figure 6B:
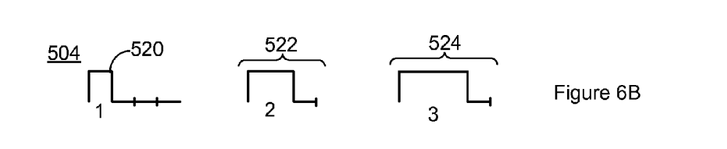
FIGS. 6B, 6C, 6D, and 6E illustrate possible modulation schemes for a high-speed signaling device.

Another method is to vary the width of the pulse as shown at 504 in FIG. 6B where phase A 520 is illustrated with a single-wide pulse, phase B 522 is illustrated with a double-wide pulse, and phase C 524 is illustrated with a triple-wide pulse.

Figure 6C:
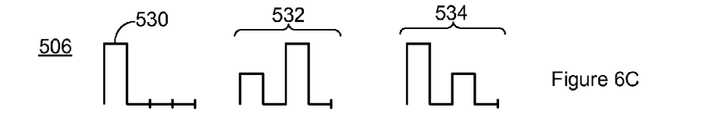

Another modulation scheme is to vary the pulse amplitude sequences as shown at 506 in FIG. 6C, where phase A 530 is indicated by a single-wide pulse at amplitude A. Phase B 532 is indicated by two single-wide pulses, the first at amplitude B and the second at amplitude A. Phase C 534 is indicated by two single-wide pulses, the first at amplitude A and the second at amplitude B.

Figure 6D:
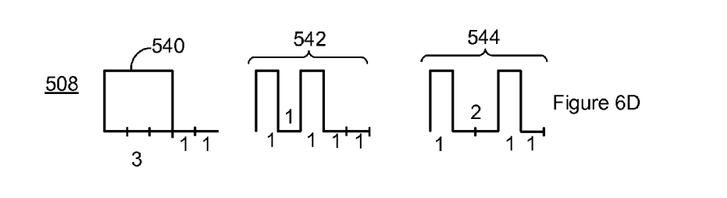

A third modulation scheme is to vary the width of the pulses and the time between them as shown at 508 in FIG. 6D, where phase A 540 is indicated by a triple-wide pulse. Phase B 542 is indicated by a pair of single-wide pulses separated by a single-wide time between them. Phase C 544 is indicated by a pair of single-wide pulses separated by a double-wide time between them.

In any of these modulation schemes, the pulse that identifies the phase may be given at a specific time such as, for example, directly following the peak in the cycle, where the reference pulse (or the larger portion thereof, such as the first pulse in FIG. 6C indicating phase C 534) is sent immediately following the peak. Further, in any of the modulation schemes, a single-wide pulse may have duration of about 200 microseconds. Thus a double-wide pulse may have duration of about 400 microseconds, and a triple-wide pulse may have duration of about 600 microseconds.

Figure 6E:
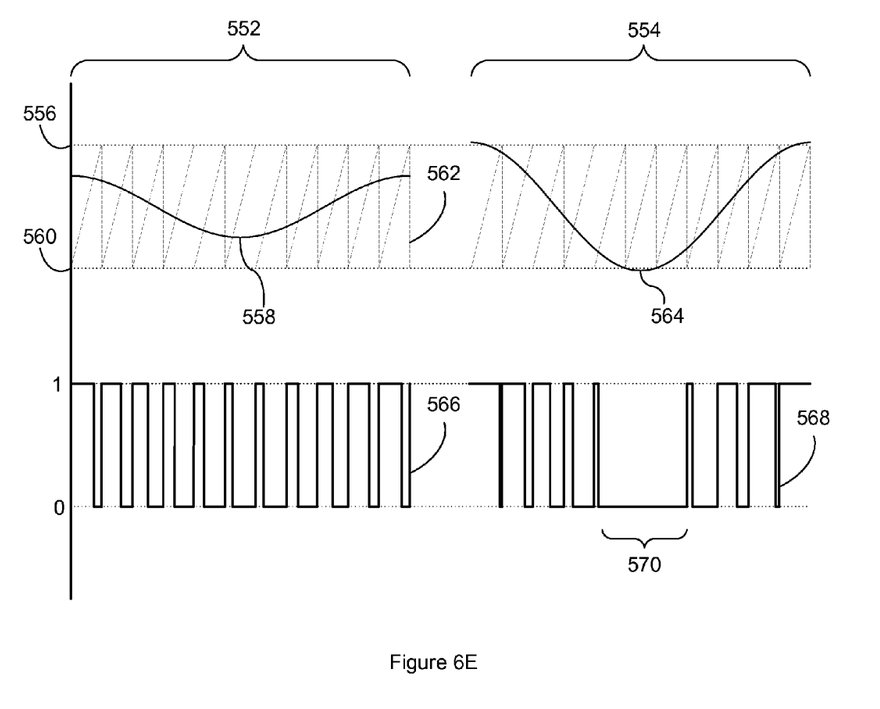

In one embodiment, to communicate current and/or fault information, the HSD may use pulse-width modulation to indicate the magnitude of the current detected. For example, the pulse width may be increased for increasing current magnitude. FIG. 6E illustrates a periodic function representing a power system condition (such as current) 558 operating within normal parameters (no fault) at 552, and operating under faulted conditions at 554. A sawtooth waveform 562 is used to compare with the power system signal 558. When the sawtooth waveform 562 is greater than the power system signal 558, the signal from the modulator 566 is low (0). When the power system signal 558 is greater than the sawtooth waveform 562, the signal from the modulator 566 is high (1). The modulator may be configured such that the power system signal 564 reaches the extremes of the sawtooth signal 562 under fault conditions. Thus only under fault conditions will a constant high (1) or low (0) signal be produced by the modulator that lasts for more than one period of the sawtooth signal 562, seen at 570. This modulation scheme may be used in combination with a phase-identification scheme such as those disclosed herein such that, for example, a phase-identifying pulse may be transmitted immediately following each extreme (or either the high or low extreme) of the power system signal.

Using the various modules and description of the HSD from above, one embodiment of an HSD includes a transmitter for reporting physical parameters such as current. This transmitter may use light (such as an IRED, light emitting diode, or the like), radio transmitter, or other means to communicate these physical parameters. As described above, this transmitter may constantly report physical parameters in a modulated manner. This transmitter may be in addition to the two other transmitters (IRED and radio transmission module) such that the HSD includes three transmitters, two for fast reporting (for security or redundancy), and a third for slow reporting. Alternatively, the HSD may include only two transmitters, both used for fast reporting, and one used for slow reporting of physical power line conditions. For example, an HSD that includes both an IRED and a radio transmitter may use the radio transmitter for constant reporting of physical parameters and use both the IRED and the radio transmitter for fast reporting of fault current or a faulted condition on the conductor.

Figure 7:
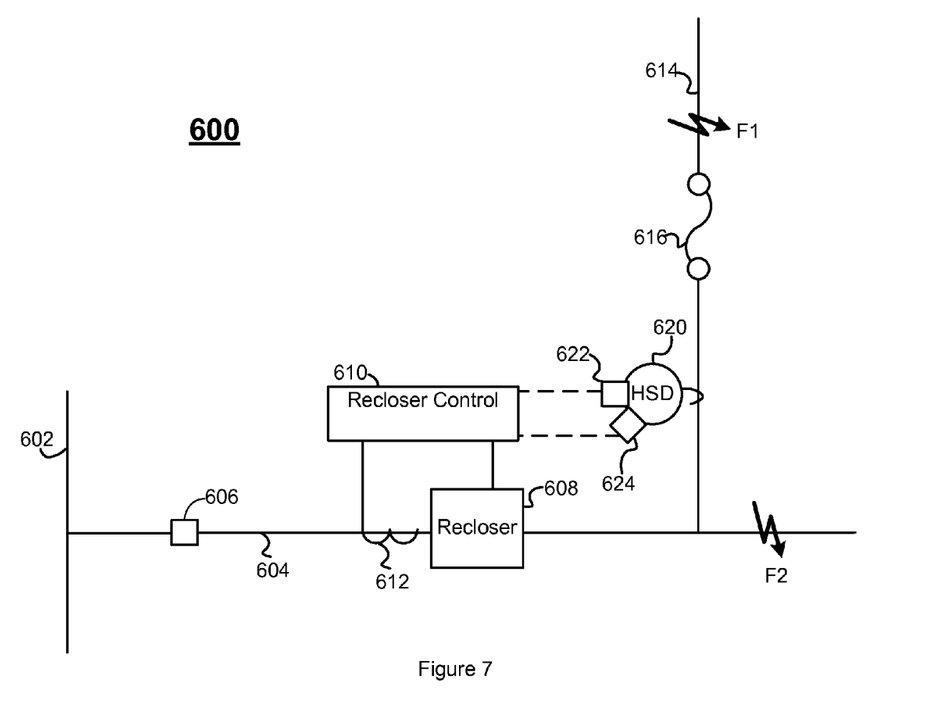
FIG. 7 is a one-line diagram of a power system of the present disclosure.

The HSD described herein may be useful in protection schemes for electric power distribution systems. FIG. 7 illustrates a one-line diagram of an electric power distribution system 600 using an HSD in accordance with the present disclosure. Bus 602 supplies electric power to feeder 604, which in turn supplies electric power to branch 614. Recipients of the electric power may receive power from the feeder 604, branch 614, or further branches (not illustrated) extending from either the feeder 604 or branch 614. Feeder 604 also includes a circuit breaker 606 and a recloser 608. Recloser 608 is controlled by an IED such as recloser control 610. Recloser control 610 may monitor the power system by receiving power system information from feeder 604 using, for example, CT 612. Using the information from CT 612, recloser control 610 is configured to make protection decisions such as whether to signal recloser 608 to open when recloser control 610 detects a fault. Recloser control 610 is configured to open only under certain conditions such that electric power continues to be provided to recipients thereof whenever possible.

As is illustrated, branch 614 includes protective equipment such as fuse 616. The fuse is configured to open branch 614 when current therethrough exceeds a threshold for a predetermined amount of time. If branch 614 experiences fault F1 downstream from fuse 616, it will blow, disconnecting the faulted section of the branch. As a result, branch 614 has at least two means of protection in the event of a fault such as fault F1 downstream of fuse 616. That is, fuse 616 may open if the fault persists for a sufficient period of time for the fuse to operate. Also, recloser control 610 may signal recloser 608 to open at recloser 608 upon detection of the fault. If recloser control 610 operates before fuse 616, then a larger portion of the distribution system would be disconnected from the source of electric power system than if fuse 610 operates before recloser control 608. Thus, it may be preferable for recloser control 610 to modify operation such that fuse 616 likely operates opening branch 614 before recloser control 610 commands recloser 608 to open when fault F1 exists on branch 614.

Under normal operating conditions, the recloser control 610 may follow an inverse-time overcurrent operating characteristic. Such characteristics are formulated to adjust the fault detection time based on the magnitude of the detected overcurrent. Higher overcurrent conditions would need to persist for a shorter amount of time for a fault condition to be declared than would a lower overcurrent condition. Such inverse-time overcurrent operating characteristics may be defined by equations, and may be coordinated with fuses present on the electric power system such that the fuse operates before the recloser control declares a fault condition.

Recloser control 610, without additional information, would not be capable of determining whether a fault occurs on a protected branch (614, protected by fuse 616) or an unprotected section of the electric power distribution system. That is, without more information, recloser control 610 would not be capable of determining whether fault F1 occurred on feeder 604, protected branch 614, or another branch (not separately illustrated). To provide this additional information, HSD 620 monitors the branch 614 and provides power system information to recloser control 610 using the principles described herein. As illustrated, HSD includes two transmitters 622 and 624. One may be optic 622 such as an IRED and fiber optic port and cable, as described herein. The other may communicate via radio transmission as described herein.

Recloser control 610 may receive information from HSD 620 via one or more transmitters of HSD 620. Recloser control 610 may be configured to use the information from HSD 620 in its protection logic.

In one embodiment recloser control 610 may be configured to operate in its normal state (e.g. following an inverse-time overcurrent characteristic) unless HSD 620 indicates that fault F1 is present on branch 614. Recloser control 610 may then alter its operations to allow fuse 616 to operate instead of recloser control 610 operating and sending a command for recloser 608 to open (thus avoiding interrupting power to the remainder of the electric power system). One way in which recloser control 610 may alter its operations is to override its fault detection logic when HSD 620 detects a fault. Accordingly, recloser control 610 will not detect or clear a fault, but instead allows fuse 616 to operate and clear the fault.

Another way in which recloser control 610 may alter its operations is to override its inverse-time overcurrent characteristic for a predetermined amount of time, thus allowing a time for fuse 616 to operate, but maintaining protection if fuse 616 fails to clear the fault F1.

Yet another modification may be to shift the inverse-time overcurrent characteristic to lag the fuse curve of fuse 616. For example if using an IEC "very inverse" characteristic (many characteristics are used, the "very inverse" being but one example), the time to declare fault is calculated using Equation 1:

$$t = \frac{13.5}{\left(\frac{I}{I_p}\right) - 1} * T_p \qquad \text{Equation 1}$$

where:
  t is the time to declare a fault;
  I is the detected current;
  $I_p$ is the current setting value; and,
  $T_p$ is the time multiplier By increasing the time multiplier $T_p$, or the current setting value $I_p$, (or both) the time required to declare a fault is increased. Accordingly, upon receiving a signal from HSD 620 of fault F1 on branch 614, recloser control 610 may be configured to increase either the time multiplier, the current setting value, or both by a predetermined amount such that fuse 616 is given time to operate before recloser control 610 declares a fault and commands recloser 608 to open.

It is possible that a fault may occur between HSD 620 and fuse 616. In this scenario, fuse 616 may not be able to clear the fault. By modifying the fault detection logic in recloser control 610 such that it waits for fuse 616 to operate but still operates for a persistent fault, recloser 610 may be capable of clearing a fault between HSD 620 and fuse 616. Further, placing HSD 620 closer to fuse 616 would decrease the likelihood of such a fault.

In another embodiment, recloser control 610 may operate according to its normal operating conditions unless, upon an overcurrent condition, signals from HSD 620 indicate that no fault is detected in feeder 614. If signals from HSD 620 indicate no fault in branch 614, then a fault such as fault F2 is likely present on a portion of the electric power system that is not monitored by HSD 620 or protected by fuse 616. Accordingly, recloser control 610 may alter its operating procedure to immediately or more rapidly detect and clear the fault. A lower detection and operating time for clearing the fault may decrease electrical stress on the electric power system. If recloser control 610 operates using an inverse-time overcurrent characteristic, it may modify the characteristic for faster fault detection time when HSD 620 indicates no fault on branch 614. This may be accomplished by, for example, decreasing the time multiplier or the current setting value of Equation 1, (or both) by a predetermined amount so as to decrease the time to declare a fault condition, and send a command to open recloser 608.

The recloser control 610 may be configured for security by requiring both signaling modules 622 and 624 of the HSD 620 to provide a signal indicating a fault or no-fault before modifying a protection algorithm. Alternatively, the recloser control 610 may be configured for redundancy by requiring either signaling module 622 or 624 of the HSD 620 to provide a signal indicating a fault or no-fault before modifying a protection algorithm.

Figure 8:
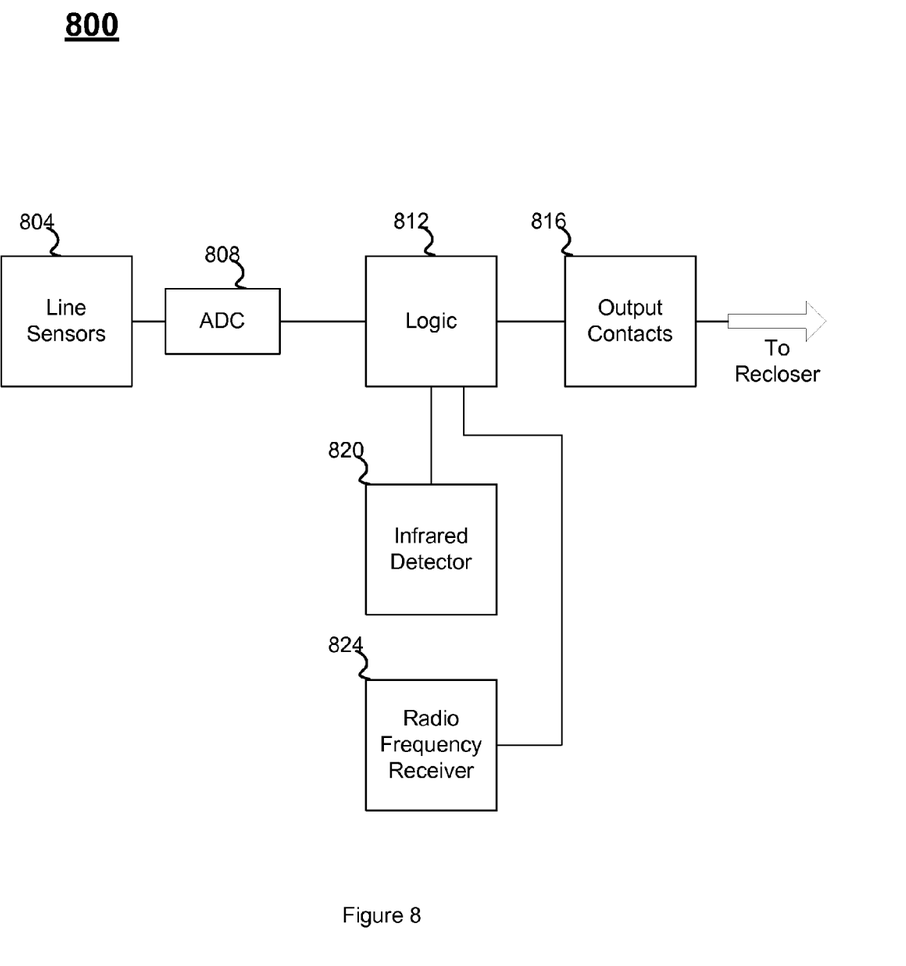
FIG. 8 is a block diagram of a faulted circuit indicator.

FIG. 8 illustrates a block diagram of a recloser control 800 in accordance with the present disclosure. The recloser control 800 includes a line sensor 804 such as a CT configured to receive power system information from the power system. The power system information is transmitted to an analog-to-digital converter 808, which communicates the digitized signals to the logic module 812. The logic module 812 may operate on a microprocessor, field programmable gate array (FPGA), application specific integrated circuit (ASIC), or the like. Further, logic may be stored in a memory or other computer readable medium (not separately illustrated). The recloser control 800 may further include an infrared detector 820 and/or a radio frequency receiver 824, for receiving signals from an HSD. The signals from the infrared detector 820 and the radio frequency receiver 824 may be communicated to the logic module 812 where the protection logic and protection logic modifications of the present disclosure are performed. The logic module 812 is in communication with the output contacts 816, which signal the recloser to open or close.

One specific advantage of the HSDs of the present disclosure is signaling speed. For an IED to have time to modify its protection algorithms, it may need to receive signals within three power system cycles of detecting the fault. The HSDs of the present disclosure are capable of such signaling times. Further, certain protection logic is time-inverse in nature such that higher fault currents result in faster response times. Thus, the IED may require signals within one power system cycle of detecting the fault. The HSDs of the present disclosure are capable of such signaling times.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for detecting and isolating a fault in an electric power distribution system, comprising:
  an intelligent electronic device including an input for receiving signals from a feeder of the distribution system and a receiver for receiving signals corresponding to a power system condition on a branch of the distribution system;
  a first protective equipment on the feeder of the distribution system configured to open upon receiving a signal from the intelligent electronic device;
  a second protective equipment on the branch of the distribution system configured to open the branch; and
  a high-speed signaling device in communication with the branch, comprising a sensing circuit configured to detect a power system condition on the branch, a signaling circuit in communication with the sensing circuit configured to produce a modulated signal corresponding to the power system condition, and a transmitter in communication with the signaling circuit for transmitting the modulated signal to the intelligent electronic device;
  wherein upon the detection of a fault, the modulated signal comprises an indication of both a fault condition and an indication of a phase associated with the fault condition.

2. The system of claim 1, wherein the intelligent electronic device comprises a logic module operating a protection algorithm in communication with the input and the receiver, and configured to modify the protection algorithm in response to the modulated signal from the high-speed signaling device.

3. The system of claim 2, wherein the protection algorithm is modified when the modulated signal indicates the fault condition.

4. The system of claim 1, wherein the modulated signal is only transmitted during a predetermined portion of a cycle for each phase.

5. The system of claim 4, wherein the predetermined portion of the cycle comprises a rising half of a positive half cycle.

6. The system of claim 1, wherein the modulated signal is transmitted for each phase during a no fault condition and the modulated signal is suspended during a fault condition.

7. The system of claim 1, wherein the phase associated with the fault condition is indicated by varying one of a pulse width, a pulse amplitude, and a time between a plurality of pulses.

8. The system of claim 1, wherein the modulated signal further comprises an indication of a magnitude of the fault.

9. The system of claim 8, wherein the magnitude of the fault is indicated by varying a pulse width of the modulated signal.

10. A system for detecting and isolating a fault in an electric power distribution system, comprising:
an intelligent electronic device including an input for receiving signals from a feeder of the distribution system and a first receiver and a second receiver for receiving signals corresponding to a power system condition on a branch of the distribution system;
a first protective equipment on the feeder of the distribution system configured to open upon receiving a signal from the intelligent electronic device;
a second protective equipment on the branch of the distribution system configured to open the branch; and
a high-speed signaling device in communication with the branch, comprising a sensing circuit configured to detect a power system condition on the branch, a signaling circuit in communication with the sensing circuit configured to produce a modulated signal corresponding to the power system condition, and a first transmitter and a second transmitter in communication with the signaling circuit for transmitting the modulated signal to the intelligent electronic device;
wherein the intelligent electronic device comprises a protection algorithm that is modified only when both signals from the first transmitter and the second transmitter indicate a fault or no-fault condition.

11. The system of claim 10, wherein the first protective equipment comprises a recloser and the intelligent electronic device comprises a recloser control.

12. The system of claim 10, wherein the second protective equipment comprises a fuse.

13. The system of claim 10, wherein the first transmitter comprises a light emitting diode, and the first receiver is capable of receiving light emitted from the light emitting diode.

14. The system of claim 13, wherein the light emitting diode is an infrared emitting diode.

15. The system of claim 10, wherein the first transmitter comprises a laser.

16. The system of claim 10, wherein the first transmitter comprises a radio frequency transmitter, and the first receiver is capable of receiving radio frequency transmissions.

17. The system of claim 10, wherein the high-speed signaling device further comprises a current transformer configured to provide power to the signaling circuit.

18. The system of claim 10, wherein the first transmitter comprises a light emitting diode the second transmitter comprises a radio frequency transmitter, the first receiver is configured to receive communication from the light emitting diode, and the second receiver is configured to receive communication from the radio frequency transmitter.

19. The system of claim 10 wherein the signaling circuit comprises a modulator.

20. A method for detecting and isolating faults on a power distribution system comprising:
a high-speed signaling device generating a modulated signal based on a condition on a first conductor protected by a first protective equipment, the modulated signal comprising an indication of both a fault condition and an indication of a phase associated with the fault condition;
transmitting the modulated signal;
an intelligent electronic device obtaining a signal from a second conductor and monitoring the second conductor using a protection algorithm;
the intelligent electronic device receiving the modulated signal; and
the intelligent electronic device modifying the protection algorithm based on the modulated signal from the high-speed signaling device.

21. The method of claim 20, further comprising modifying the protection algorithm when the signal from the high-speed signaling device represents a fault of at least one phase associated with the first conductor.

22. The method of claim 20, wherein the transmitting comprises sending a signal via a light emitting diode from the high-speed signaling device to the intelligent electronic device.

23. The method of claim 20, wherein the transmitting comprises sending a signal via radio frequency transmitter from the high-speed signaling device to the intelligent electronic device.

24. The method of claim 20, wherein the transmitting comprises sending a signal via both a light emitting diode and a radio frequency transmitter from the high-speed signaling device to the intelligent electronic device.

* * * * *